United States Patent [19]

Friedrich

[11] 4,209,086

[45] Jun. 24, 1980

[54] SYNCHROMESH GEAR

[75] Inventor: Rudolf Friedrich, Röthenbach, Fed. Rep. of Germany

[73] Assignee: Diehl GmbH & Co., Fed. Rep. of Germany

[21] Appl. No.: 13,146

[22] Filed: Feb. 21, 1979

[30] Foreign Application Priority Data

Mar. 14, 1978 [DE] Fed. Rep. of Germany ....... 2810945

[51] Int. Cl.$^2$ ............................................. F16D 13/74
[52] U.S. Cl. .................................... 192/53 F; 74/339; 74/468; 192/113 R
[58] Field of Search ................. 74/438, 339, 462, 467, 74/468; 192/53 R, 53 F, 113 R; 29/159.2

[56] References Cited

U.S. PATENT DOCUMENTS

| 2,322,970 | 6/1943 | Robbins .............................. 192/53 F |
| 3,034,383 | 5/1962 | Schulte et al. ...................... 74/438 X |

FOREIGN PATENT DOCUMENTS

| 1911409 | 8/1971 | Fed. Rep. of Germany . |
| 2055345 | 5/1972 | Fed. Rep. of Germany ........ 192/53 R |

*Primary Examiner*—Leslie Braun
*Assistant Examiner*—Conrad Berman
*Attorney, Agent, or Firm*—Scully, Scott, Murphy & Presser

[57] ABSTRACT

A synchromesh gear for a speed-change gear drive including a conically-shaped friction surface in the form of sharp-edged teeth each supporting a friction surface, which are separated from each other by oil evacuating grooves, and which is adapted for frictional mating engagement with a smooth opposite or counter cone. The teeth are arranged obliquely in the friction surface at an angle with the range of between 10° and 70°, and preferably about 30°, with respect to the direction of the generatrix of the conically-shaped friction surface. The profiles of the teeth may consist of two regions having different profile slopes, in which the region of the tooth crown evidences the steeper profile slope. The oil removal or evacuation grooves and teeth can be located on the outer surface of the synchromesh gear, as well as on its interior surface. The teeth can also be distributed either uniformly over the entire interior surface of the gear ring or also arranged discontinuously.

6 Claims, 3 Drawing Figures

SYNCHROMESH GEAR

BACKGROUND OF THE INVENTION

1. Field of the Invention

The present invention relates to a synchromesh gear for a speed-change gear drive including a conically-shaped friction surface in the form of sharp-edged teeth each supporting a friction surface, which are separated from each other by oil evacuating grooves, and which is adapted for frictional mating engagement with a smooth opposite or counter cone.

2. Discussion of the Prior Art

A synchromesh gear of this type has already become known from U.S. Pat. No. 3,034,383. In this known synchromesh gear, an inner cone is interrupted by oil evacuating grooving or flutes which are uniformly distributed over the entire periphery and which extend in the direction of the generatrix of the cone and, in this manner, the cone is provided with an internal toothing. The surfaces of the teeth forming the inner cone are herewith constructed as friction surfaces and effect the friction engagement with the smooth opposite cone. Concurrently, the teeth are imparted the task, at the commencement of the snychromeshing sequence, of breaking the lubricating oil film which is present on the opposite cone whereby the oil will collect in the oil evacuating grooves and be removed therethrough as rapidly as possiblw from the region of the opposite cone which is necessary for the synchromeshing.

For the same purpose there is also known from German Published Pat. No. 1,911,409 a synchromesh gear which is constituted of a sintered material wherein, in a similar manner, the teeth are arranged to extend in an axial direction.

These known synchromesh gears, in contrast with similarly known synchromesh gears which are provided with threaded grooves, possess the advantage of being simpler to manufacture as well as being more wear-resistant. Nevertheless, the known synchromesh gears are commonly subject to the disadvantage that the removal of the lubricating oil film from the surface of the opposite or counter cone extends over a relatively lengthy period of time. The result thereof is a detrimentally long slippage movement between the friction surface and the opposite cone which will lead to a delay of the synchromeshing sequence, as well as to increased amount of wear.

SUMMARY OF THE INVENTION

Accordingly, it is an object of the present invention to so construct a synchromesh gear of the above-mentioned type as to be able to strip off the lubricating oil film as rapidly as possible from the opposite or counter cone. In addition thereto, this synchromesh gear should be as simple as possible in its manufacture and extremely highly wear-resistant.

The foregoing object of the present invention is achieved in that the teeth are arranged obliquely in the friction surface at an angle with the range of between 10° and 70°, and preferably about 30°, with respect to the direction of the generatrix of the conically-shaped friction surface.

Due to that type of arrangement of the teeth, and thereby also the oil evacuation grooves, there is achieved that, in addition to centrifugal force, a further force component acts on the oil which is present on the opposite cone, which accelerates the oil along the direction of the generatrix of the cone. Consequently, the oil is removed with the greatest possible speed from the region of the opposite cone which is required for the frictional engagement.

Concurrently, due to the oblique arrangement of the teeth, there is increased the effective length of the edges which break the lubricating oil film, which will also assist in the more rapid removal of this film. Finally, this arrangement affords a more uniform contacting of the friction of the synchromesh gear against the opposite cone, whereby there is additionally reduced the amount of wear.

A further advantage can be ascertained in that the inventive synchromesh gear can produced of materials which are known as being applicable to those types of gear rings, such as heavy metal, light metal, or sintered material, in particular also those from silicon-containing aluminum alloys, particularly as are known in the form of wear-resistant piston alloys. When the synchromesh gear is produced through drop-forging, then the oil evacuating grooves can be already directly impressed into the ring during the forging so as to merely require a subsequent deburring as well as finish processing of the friction surface by means of truing. Correspondingly simple is the manufacture from sintered material in which the synchromesh gear obtains its final form and strength already during the pressing sequence. Hereby, for all materials which are employed for the production, there is afforded an extremely simple and inexpensive manufacfure.

In the preferred embodiment of the synchromesh gear constructed pursuant to the invention, the profiles of the teeth consist of two regions having different profile slopes, in which the region of the tooth crown evidences the steeper profile slope.

As a result, the oil evacuating grooves are adequately set off from the friction surface in a sharp-edged manner. Concurrently, the steep profile slope in the region of the tooth crown allows that the tolerances produced during the finishing turning or truing of the friction surface will no t exert too extensive an influence over the size of the friction surfaces of the individual teeth and thus, in all instances, there will remain present the sought-after relationship between the friction surface and the recesses for an optimum synchromeshing effect of the particular gear ring.

On the other hand, as a result of the lesser profile slope at the tooth root there is effected a connection of the teeth to the gear ring material capable of supporting loads so that a breaking off of individual teeth during loading is largely avoided. Hereby, particularly also for synchromesh gear rings which are formed of sintered material, there is substantially enhanced the stability thereof.

Within the scope of the invention, the oil removal or evacuation grooves and teeth can be located on the outer surface of the synchromesh gear, as well as on its interior surface. Furthermore, in the last-mentioned instance, the teeth can be distributed either uniformly over the entire interior surface of the gear ring or also arranged discontinuously.

In the last-mentioned constructional embodiment, the toothing is interrupted in the neighborhood of those areas in which the outer surface of the ring is provided with recesses. The ring evidences an inner diameter at these locations which is slightly larger than the inner diameter of the conically-shaped friction surface which is formed by the teeth.

By means of this interruption of the toothing, in these areas there is considered the already previously reduced material cross-section and a further weakening of the material is avoided, such as would be effected due to the introduction of the oil evacuation grooves. Since the oil film is not removed at these locations due to the absence of these grooves, and the ring must thus entirely slide on the oil film, the inner diameter of the gear ring is here enlarged to such an extent whereby these areas cannot contact the opposite or counter cone.

BRIEF DESCRIPTION OF THE DRAWINGS

An exemplary embodiment of the inventive synchromesh gear ring is now elucidated in detail hereinbelow in conjunction with the accompanying drawings; in which.

DETAILED DESCRIPTION

Figure 1:
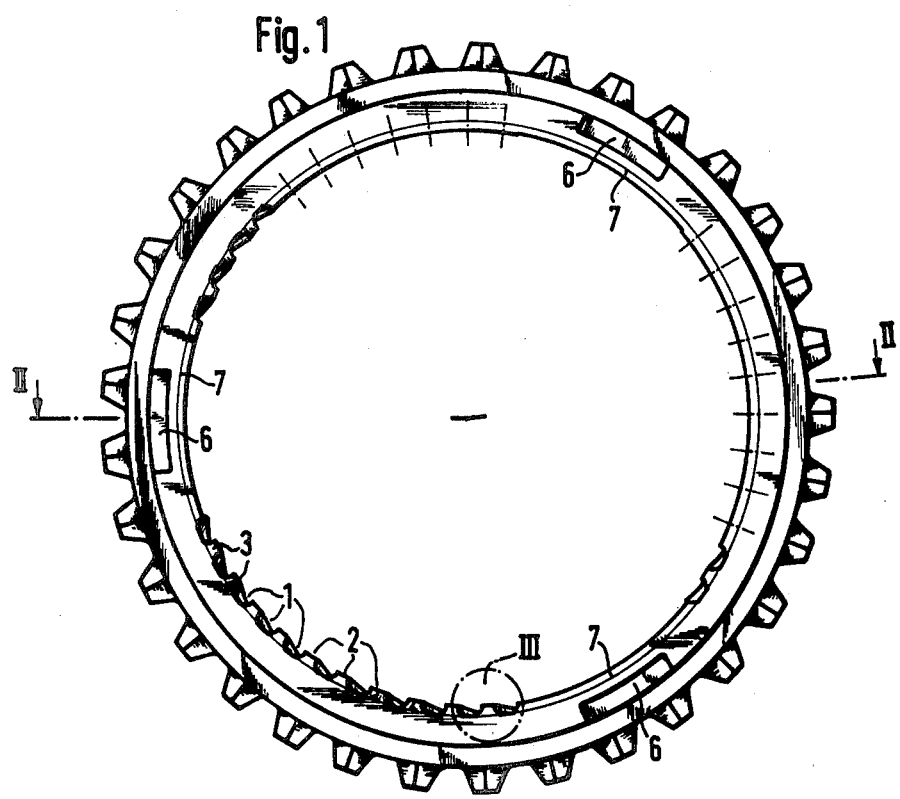
FIG. 1 illustrates a front view of a synchromesh gear ring constructed pursuant to the invention.
Figure 2:
FIG. 2 is a sectonal view taken along line II—II in FIG. 1.
Figure 3:
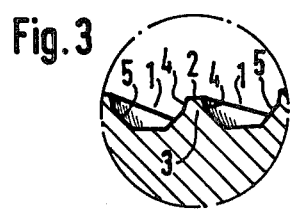
FIG. 3 is an enlarged fragmentary sectional view of the frictional surface as shown in the encircled portion III in FIG. 1.

In the various figures of the drawings, the same elements of the synchromesh gear are designated with the same reference numerals.

The illustrated synchromesh gear ring includes on its interior side a conically-shaped friction surface which is intended for frictional mating or cooperative engagement with a smooth counter or opposite cone (not shown), and which is constituted of sharp-edged teeth 3 each provided with a friction surface 2 and separated from one another by oil evacuation grooves 1. The oil evacuation grooves 1 hereby extend in the cone surface obliquely at about 30° relative to the direction of the generatrix of the cone, so that the teeth evidence the same orientation along their longitudinal direction.

The profiles or sides of the teeth consist of two regions 4, 5 having differing profile slopes, wherein the region of the tooth crown 4 evidences the steeper profile slope: In this exemplary embodiment, the region 4 is sloped at an angle of about 30°, and the region 5 at an angle of about 50° with respect to the vertical.

Furthermore, in the herein illustrated exemplary embodiment, the interior surface of the ring does not include oil evacuation grooves 1 and thereby no toothing in the vicinity of those locations at which the exterior surface is provided with recesses or cutouts 6. The recesses 6 are adapted for engagement by suitable actuating mechanisms (not shown). In these areas 7, the ring possesses an inner diameter which is slightly larger than that of the friction surface which formed by the friction surfaces 2 of the teeth 3.

During the synchromeshing sequence in which the synchromesh gear ring is pressed against the opposite cone, these areas 7 will thus not come into contact with the opposite cone. The lubricating oil film which is present thereon is now fragmented by the obliquely arranged sharp-edged teeth 3 and, through the intermediary of the correspondingly extending grooves, is in a screw-like manner and as rapidly as possible evacuated outwardly.

What is claimed is:

1. In a synchromesh gear for a speed-change gear drive including a conically-shaped friction surface adapted for frictional engagement with a smooth counter cone, said conically-shaped friction surface being in the shape of sharp-edged teeth each having a frictional surface and oil evacuating grooves separating said teeth, the improvement comprising: said teeth being arranged in said conically-shaped friction surface and obliquely extending at an angle in the range of 10 to 70 degrees relative to the direction of the generatrix of said conically-shaped friction surface.

2. Synchromesh gear as claimed in claim 1, said angle being about 30 degrees.

3. Synchromesh gear as claimed in claim 1, each of said teeth having profiles including two regions of differing profile slopes, the region of the tooth crown of each said tooth having a steeper profile slope.

4. Synchromesh gear as claimed in claim 1, said teeth being arranged on the interior side of said gear.

5. Synchromesh gear as claimed in claim 4, comprising recesses being formed in the outer surface of said gear, said teeth being provided in the interior side of said gear remote from the locatons of said recesses so as to have a diameter which is slightly larger than the diameter of the conically-shaped friction surface formed by said teeth.

6. Synchromesh gear as claimed in claim 4, said teeth being uniformly distributed about the entire interior side of said synchromesh gear.

* * * * *